United States Patent [19]

Miyahara et al.

[11] Patent Number: 4,565,102
[45] Date of Patent: Jan. 21, 1986

[54] PTO-DRIVING OF DOUBLE-CLUTCH-INCORPORATED TYPE TRANSMISSION

[75] Inventors: Masayoshi Miyahara, Sakai; Masao Takagi, Hashimoto, both of Japan

[73] Assignee: Kubota, Ltd., Japan

[21] Appl. No.: 731,330

[22] Filed: May 6, 1985

Related U.S. Application Data

[63] Continuation of Ser. No. 416,703, Sep. 10, 1982.

[30] Foreign Application Priority Data

Sep. 11, 1981 [JP]  Japan .................... 56-135622[U]

[51] Int. Cl.⁴ .................... F16H 37/00; F16H 3/38
[52] U.S. Cl. .................... 74/15.4; 74/15.8; 74/15.84; 74/15.86; 74/340
[58] Field of Search ............ 74/340, 341, 342, 344, 74/15.2, 15.4, 15.6, 15.63, 15.66, 15.69, 15.8, 15.82, 15.84, 15.86, 15.88

[56] References Cited

U.S. PATENT DOCUMENTS

| | | | |
|---|---|---|---|
| 1,098,912 | 6/1914 | Law | 74/344 |
| 2,862,398 | 12/1958 | Zeidler et al. | 74/342 |
| 2,880,833 | 4/1959 | Stevenson et al. | 74/15.84 |
| 2,975,656 | 3/1961 | Haverlender | 74/15.63 |
| 3,204,468 | 9/1965 | Ruoff | 74/15.63 |
| 3,733,912 | 5/1973 | Murayama et al. | 74/15.86 |
| 4,208,923 | 6/1980 | Ikegami | 74/15.63 |
| 4,245,514 | 1/1981 | Miyahara et al. | 74/15.84 |

Primary Examiner—Rodney H. Bonck
Assistant Examiner—Michael D. Bednarek
Attorney, Agent, or Firm—Cushman, Darby & Cushman

[57] ABSTRACT

PTO-driving of a double-clutch-incorporated type transmission characterized in that the PTO-driving comprises a first gearing mechanism interlocking with a PTO main shaft, a second gearing mechanism interlocking with a running-travel main shaft, and a coupling means functioning to selectively drivably couple the said gearing mechanisms with a PTO transmission shaft.

4 Claims, 3 Drawing Figures

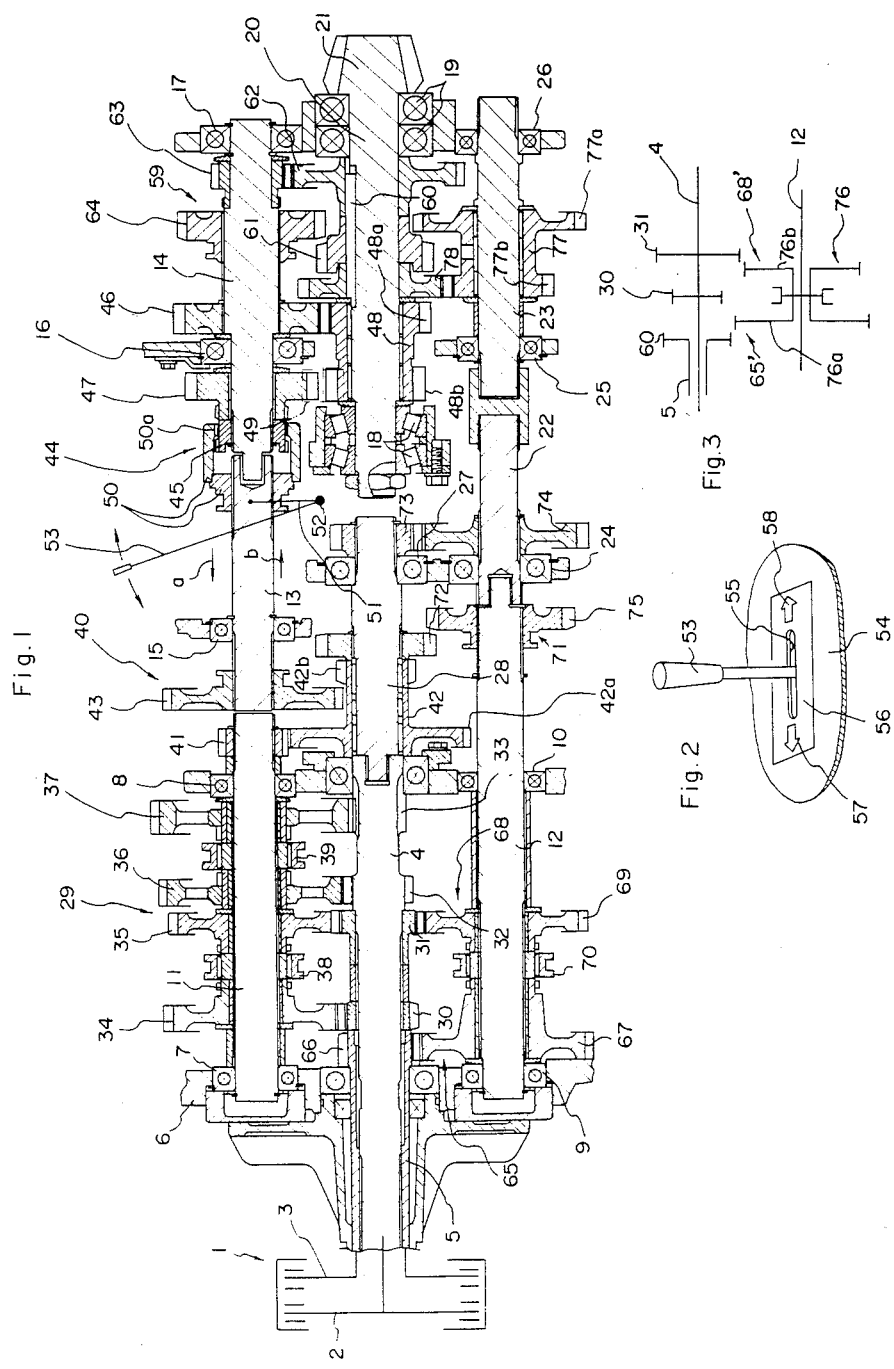

PTO-DRIVING OF DOUBLE-CLUTCH-INCORPORATED TYPE TRANSMISSION

This is a continuation of application Ser. No. 416,703, filed Sept. 10, 1982, which was abandoned upon the filling hereof.

BACKGROUND OF THE INVENTION

This invention relates to PTO-driving of a double-clutch-incorporated type power transmission as installed in self-propelling vehicles as tractors and the like.

Among the conventional tractors there is a type which is equipped with a double-clutch-incorporated transmission, more particularly with such clutch means including a running-travel clutch and a PTO clutch disposed in juxtaposition, with a running-travel main shaft and a PTO main shaft, as are in driving connection to the said respective clutches for the power transmission therethrough respectively to the running travel and the PTO systems, are disposed in an inner and outer double shaft manner, thus one fitted within the other hollow tube shaft. It is normally the practice in such type to have the said respective clutches interlocked with a single, common clutch pedal in such manner that the first step pedalling down causes the running travel clutch to be clutched off and the further deep second step pedalling down then the remaining PTO clutch. Such conventional manner is indeed very convenient when in use as a work vehicle for pasture field work or the like, but such PTO clutch can be clutched off only when the pedal is deeply trodden down to said second step, even when in use where no such double clutching operation is in fact needed, thus resulting in a drawback of requiring such unnecessarily large stroke pedalling down.

SUMMARY OF THE INVENTION

This invention has as its object to eliminate the conventional problems as mentioned hereinabove, and is characterized in providing a first and a second gearing mechanisms, respectively interlocking with the PTO main shaft and the running-travel main shaft, and a coupling means functioning to selectively drivably couple the said gearing mechanisms with a PTO transmission shaft.

It is possible, accordingly, by shifting the said coupling means to drivably couple the PTO main shaft with the PTO transmission shaft, via the first gearing mechanism, to provide transmission of the double-clutch-incorporated type just as such as has conventionally been, thus for very convenient use in the pasture field work or the like, and on the other hand by shifting the said coupling means to drivably couple the running-travel main shaft with the PTO transmission shaft, via the second gearing mechanism, to provide transmission of effective single-clutch-incorporated type as to enable clutching-off operation of both the running travel and the PTO systems at the same time by means of simple first step treadding down of the clutch pedal. Namely, the PTO-driving according to this invention, being constructed by nature as double-clutch-incorporated type, can be used arbitrarily in effect also as single-clutch-incorporated type, not to say as said double type, simply by shifting the coupling means, thus freely in either of said two types, as may be convenient depending upon the type of the work specifically given or intended.

Further objects and advantages of this invention will be apparent from the detailed description to follow hereunder.

BRIEF DESCRIPTION OF THE DRAWINGS

The drawings non-limitatively illustrate only a couple of preferred embodiments of the PTO-driving of double-clutch-incorporated type according to this invention, wherein FIG. 1 is a longitudinal vertical sectional view of the transmission;

FIG. 2 is a perspective view of the transmission change-over lever; and

FIG. 3 is a schematic diagram of a modified form of the essential portion of the transmission.

DETAILED DESCRIPTION OF THE PREFERRED EMBODIMENTS

Referring first to FIG. 1, a double-clutch-incorporated type apparatus, designated generally at (1), is provided, within a clutch housing, with a running-travel clutch (2) and a PTO clutch (3). A running-travel main shaft (4), drivably associated with the running-travel clutch (2), and a PTO main shaft (5), drivably associated with the PTO clutch (3), are disposed in an inner and outer double shaft manner, thus the former fitted within the hollow-tube type latter, and they are held as journalled piecing through a partition wall (6) between said clutch housing and a transmission case therebehind, respectively for free rotation. Above and underneath the running-travel main shaft (4) there respectively are journalled, via bearings (7)(8),(9)(10), a first running-travel transmission shaft (11) and a first PTO transmission shaft (12). Rearwardly of said first running-travel transmission shaft (11), on the extension of the axis thereof, there are journalled a second and a third running-travel transmission shafts (13)(14) via bearings (15)(16)(17). Underneath said third running-travel transmission shaft (14) and rearwardly of the running-travel main shaft (4), on the extension of the axis thereof, there is journalled a fourth runniing-travel transmission shaft (20) via bearings (18)(19). Said fourth running-travel transmission shaft (20) is drivably associated, via a bevel pinion (21), with a differential (not illustrated any further). Rearwardly of the first PTO transmission shaft (12), on the extension of the axis thereof, there are journalled a second and a fourth PTO transmission shafts (22)(23) via bearings (24)(25)(26). In between the running-travel main shaft (4) and the fourth running-travel transmission shaft (20) there is journalled, via a bearing (27) and so forth, a third PTO transmission shaft (28). A main change-speed apparatus, designated generally at (29), comprises: gears (30)(31)(32)(33) on the running-travel main shaft (4); gears (34)(35)(36)(37) fitted, to always mesh therewith, on the first running-travel transmission shaft (11), for free idling rotation; a shifter (38) fitted on the first running-travel transmission shaft (11), for free axial force-and-aft sliding only to thus selectively engage with the gears (34) and (35); and another shifter (39) similarly fitted but to selectively engage with the gears (36) and (37). A creeper change-speed apparatus, designated generally at (40), comprises: a gear (41) fixedly secured on the first running-travel transmission shaft (11); a creeper gear set (42) fitted on the third PTO transmission shaft (28), for free idling rotation, with its larger-diameter gear (42a) meshable with the gear (41); and a shifter gear (43) which is fitted on the second running-travel transmission shaft (13) in a splined manner and which is selectively engageable and disengageable with the first running-travel transmission shaft (11) and with a smaller-diameter gear (42b) of the creeper gear set (42). A forward-and-rearward-travel change-over mechanism, designated generally at (44), comprises: a spline boss (45) and a gear (46), fixedly secured on the third running-travel transmission shaft (14); a gear (47) fitted on the third running-travel transmission shaft (14), for free idling rotation; a gear set (48) fitted on the fourth running-travel transmission shaft (20), for free idling rotation, with its larger-diameter gear (48a) that meshes with the gear (46); an intermediary gear (49) that meshes with the gear (47) and with a smaller-diameter gear (48b) of the gear set (48); and a shifter (50) fitted on the second running-travel transmission shaft (13) in a splined manner, with its meshing engagement portion (50a) selectively engageable and disengageable with the spline boss (45) and with the gear (47). To the shifter (50) there is engaged a shifter lever (51), which is fixedly secured on a rocking shaft (52) piercedly supported by means of the lateral wall of the transmission case and is operatively connected, via the rocking shaft (52), to a change-over lever (53). As shown in FIG. 2, the change-over lever (53) is movable back and forth about the rocking shaft (52), along a guiding slot (55) of a guide plate (54), wherein the maneuvering direction and the selected direction of the forward-and-rearward-travel change-over mechanism (44) are made in conformance. More particularly, on a sign tag (56) of the guide plate (54), there are marked arrows (57)(58) at the front and rear ends thereof. An auxiliary change-speed apparatus, designated generally at (59), comprises: gears (61)(62) secured on to the fourth running-travel transmission shaft (20) by means of a key (60); a gear (63) fitted on the third running-travel transmission shaft (14), for free idling rotation, to mesh with the gear (62); and a shifter gear (64) fitted on the third running-travel transmission shaft (14) in a splined manner, to be engageable and disengageable with the gears (61)(63). A first gearing mechanism, designated generally at (65), comprises: a gear (66), fixedly secured on a rear end of the PTO main shaft (5); and a gear (67) which meshes with said gear (66) and which is fitted on the first PTO transmission shaft (12), for free idling rotation. A second gearing mechanism, designated generally at (68), comprises: the already-mentioned gear (31) fixedly secured on the running-travel main shaft (4); and a gear (69) fitted on the first PTO transmission shaft (12), for idling rotation, to mesh with the gear (31). As to the speed reduction ratios of the first and second gearing mechanisms (65)(68), that of the first gearing mechanism (65) is somewhat larger than that of the second gearing mechanism (68); wherein either one of the gears (67)(69) of these respective mechanisms (65)(68) is selectively drivably connectable with the first PTO transmission shaft (12) by means of a shifter (70) serving as a coupling means. A PTO change-speed apparatus, designated generally at (71), comprises: gears (72)(73) fixedly secured on the third PTO transmission shaft (28); a gear (74) fixedly secured on the second PTO transmission shaft (22), to mesh with the gear (73); and a shifter gear (75) fitted on the first PTO transmission shaft (12), in a splined manner, to be engageable and disengageable with the gear (72) and with the second PTO transmission shaft (22). A gear set (77), having a larger-diameter gear (77a) and a smaller-diameter gear (77b), which latter meshes with a gear (78) fixedly secured on the fourth running-travel transmission shaft (20), and fitted on the fourth PTO transmission shaft (23), for idling rotation, is for driving non-illustrated front wheels.

With the construction as above, driving power from the engine is transmitted through the running-travel clutch (2), running-travel main shaft (4), main change-speed apparatus (29), first running-travel transmission shaft (11), creeper change-speed apparatus (40), second running-travel transmission shaft (13), forward-and-rearward-travel change-over mechanism (44), third running-travel transmission shaft (14), auxiliary change-speed apparatus (59) and fourth running-travel transmission shaft (20), and then from the differential apparatus to the rear wheels and at the same time through the meshing gear train (78)(77) to the front wheels as well. In such transmission, multi-stage speed changing is possible, more particularly in four steps in the main change-speed apparatus (29) by means of maneuvering the shifters (38)(39) and respectively in two steps in the creeper change-speed apparatus (40) and the auxiliary change-speed apparatus (59) by means of maneuvering the respective shifter gears (43)(64).

In order to change over the forward and rearward travels, if the change-over lever (53) is maneuvered in the direction per the arrow (57) on the sign tag (56), then the shifter (50) is slidedly moved in the direction per arrow a, so that the meshing engagement portion (50a) comes in engagement with the spline boss (45) and accordingly that the driving power is transmitted from the second transmission shaft (13) via the spline boss (45) to the third running-travel transmission shaft (14) and therefore the vehicle runs in the direction the same as per the arrow (57) on the sign tag (56). On the other hand, if the change-over lever (53) is maneuvered in the direction per arrow (58), then the shifter (50) is slidedly moved in the direction per arrow b, so that it comes in engagement with the gear (47) and accordingly that the driving power of the second running-travel transmission shaft (13) is transmitted via the gear (47), intermediary gear (49) and gears (48)(46) to the third running-travel transmission shaft (14) and therefore this third running-travel transmission shaft (14) rotates in a direction opposite to that mentioned hereinbefore and thus the vehicle runs in the direction the same as per the arrow (58). As is now apparent, since the maneuvering direction of the change-over lever (53) and the running travel direction of the vehicle resulting from such change-over operation of the forward-and-rearward-travel change-over mechanism (44) are in conformance, it is possible-even in such type of the vehicle adapted to arbitrary forward and rearward posture alteration of the driving quarter, namely the driver's seat, steering wheel and so forth, and when the driver has just altered the posture—to prevent malmaneuvering of making error in selecting the proper forward and rearward running travels, and it is here possible to effect the speed changing in sixteen steps each in either of the forward and rearward travels, thus to obtain practically any vehicle speed properly suited for the work actually given or intended to perform.

As to implement driving, supposing first the case of driving an implement requiring double clutch maneuvering, then the shifter (70) is caused to engage with the gear (67), thus to connect the first gearing mechanism (65) to the first PTO transmission shaft (12). Thereby, the driving power from the engine is transmitted as from the PTO clutch (3) through the PTO main shaft (5), first gearing mechanism (65), first PTO transmission shaft (12), PTO change-speed apparatus (71), second PTO transmission shaft (22) and fourth PTO transmission shaft (23), and then from the PTO shaft to the implement. Here, two-step speed changing is possible by means of the PTO change-speed apparatus (71). As for the speed reduction ratio of the first gearing mechanism (65), it is designed such that rotation of about 540 r.p.m. and 1000 r.p.m. may be obtained by means of change-over of the PTO change-speed apparatus (71), with the engine in its full rotation, in view that for works requiring such double clutch maneuvering it is usual to set the PTO shaft rotation at such 540 and 1000 r.p.m.

In the case of driving an implement not requiring double clutch maneuvering, the shifter (70) is then caused to engage with the gear (69), thus to transmit the driving power from the running-travel main shaft (4) via the second gearing mechanism (68) to the first PTO transmission shaft (12). Accordingly, since the PTO system can thus be clutched on and off by means of the running-travel clutch (2), the maneuvering is very easy, in that the pedalling stroke may be kept small and so forth. In this case, as for the speed reduction rate of the second gearing mechanism (68), it is designed so as to realize the PTO shaft rotation in about 800 r.p.m. and 1300 r.p.m.

By the way, as for the first and the second gearing mechanism (65)(68), it is as well conceivable, besides providing same in the constantly meshing type as shown in FIG. 1, to provide same in selectively meshing type, as shown in FIG. 3, wherein the first and the second gearing mechanisms as so modified are designated respectively at (65') and (68'), and wherein the shifter gear (76) is provided with sectional gear portions (76a)(76b) engageable in meshing respectively with the gears (66)(31), and such shifter gear (76) is fitted on the first PTO transmission shaft (12), in splined manner. It should be noted, however, that smooth change-over maneuvering with slighter force is possible with the said constantly meshing type shown in FIG. 1, since the sliding member to move relative to the first PTO transmission shaft (12) is in such type no more than a relatively small and lightly movable shifter (70). Furthermore, it is as well conceivable, as for these first and the second gearing mechanisms (65,65')(68,68'), to provide them in one and the same speed reduction ratio, though it is preferable to provide them, as already mentioned hereinbefore, such that the speed reduction ratio of the first gearing mechanism (65)(65') is somewhat larger than that of the second gearing mechanism (68)(68'), so as to result the PTO shaft rotation of 540 and 1000 r.p.m. when used in the double clutch maneuvering mode and that of 800 and 1300 r.p.m. When used in the effective single clutch maneuvering mode, the rotation speeds being best suited for such respective modes of works.

We claim:

1. PTO-drive for double-clutch type transmission comprising a double clutch apparatus including:

a running-travel clutch and a PTO clutch having a PTO transmission shaft, said running-travel and PTO clutches disposed in operative juxtaposition relative to one another;

a running-travel main shaft drivable from th running-travel clutch;

a PTO main shaft drivable from the PTO clutch, said running-travel shaft being concentrically disposed within said PTO main shaft;

travel-transmission shaft means for transmitting engine power from said running-travel main shaft;

main speed-change means operatively associated with said running-travel main shaft for operatively interconnecting said running-travel main shaft and said travel-transmission shaft means to change running travel speeds, wherein said running-travel main shaft, said main speed-change means and said travel-transmission shaft means together establish a travel drive line;

first and second gear means for being respectively driven by the PTO main shaft and the running-travel main shaft; and coupling means movable between a first position for selectively coupling said PTO transmission shaft to said PTO main shaft through said first gear means, and a second position for selectively coupling said PTO transmission shaft to said running-travel main shaft through said second gear means, wherein said running-travel main shaft, said second gear means and said PTO transmission shaft together define a PTO drive line when said coupling means is moved to said second position such that operation of said main speed change means to effect speed change through said travel drive line does not affect PTO drive speed through said PTO drive line.

2. PTO-drive as claimed in claim 1 wherein the speed reduction ratio of the first gear means is somewhat larger than that of the second gear means.

3. PTO-drive as claimed in claim 2, wherein said first gear means includes a first gear fixedly secured on the PTO main shaft, and a second gear which meshes with the first gear and which is fitted on the PTO transmission shaft for idling rotation, and wherein said second gear means includes a third gear fixedly secured on the running-travel main shaft, and a fourth gear which meshes with the third gear and which is fitted on the PTO transmission shaft for idling rotation.

4. PTO-driving as claimed in claim 2, wherein the first gear means includes a gear fixedly secured on the PTO main shaft and a sectional gear portion which is engageable in meshing with the gear just now mentioned and which is an integral portion of a shifter gear set fitted on the PTO transmission shaft in splined manner, and wherein the second gear means includes a gear fixedly secured on the running-transmission shaft and a sectional gear portion which is engageable in meshing with the gear just now mentioned and which is another integral portion of the said shifter gearset.

* * * * *